(12) United States Patent
Pedrazzini Bertolazzi (10) Patent No.: US 12,264,741 B2
(45) Date of Patent: Apr. 1, 2025

(54) COMBINED MACHINE WITH SELECTIVE ACTUATION

(71) Applicant: ITAL RESEARCH & INNOVATION SRL, Crema (IT)

(72) Inventor: Marino Pedrazzini Bertolazzi, Crema (IT)

(73) Assignee: ITAL RESEARCH & INNOVATION SRL, Crema (IT)

( * ) Notice: Subject to any disclaimer, the term of this patent is extended or adjusted under 35 U.S.C. 154(b) by 0 days.

(21) Appl. No.: 18/542,296

(22) Filed: Dec. 15, 2023

(65) Prior Publication Data

US 2024/0200638 A1    Jun. 20, 2024

(30) Foreign Application Priority Data

Dec. 16, 2022    (IT) .......................... 102022000025833

(51) Int. Cl.
*F16H 7/08*  (2006.01)
*F16H 7/12*  (2006.01)
(Continued)

(52) U.S. Cl.
CPC ............. *F16H 7/0827* (2013.01); *F16H 7/12* (2013.01); *F16H 2007/0842* (2013.01);
(Continued)

(58) Field of Classification Search
CPC .......... F16H 7/0827; F16H 2007/0893; F16H 2702/00; F16H 7/12; F16H 2007/0842;
(Continued)

(56) References Cited

U.S. PATENT DOCUMENTS

| 128,466 A | * | 7/1872 | Crane | G07B 17/00362 |
| | | | | 192/224.2 |
| 201,150 A | * | 3/1878 | Bevins | G07B 17/00362 |
| | | | | 192/224.2 |
| 402,758 A | * | 5/1889 | Medart | F16H 7/0827 |
| | | | | 474/119 |
| 429,877 A | * | 6/1890 | Anderson | F16H 7/0827 |
| | | | | 474/119 |

(Continued)

FOREIGN PATENT DOCUMENTS

| AP | 394 A | 8/1995 |
| FR | 1234202 A | 10/1960 |

(Continued)

OTHER PUBLICATIONS

Search Report for IT 2022000025833 dated May 12, 2023, 9 pages.

*Primary Examiner* — Henry Y Liu
(74) *Attorney, Agent, or Firm* — NIXON & VANDERHYE (57) ABSTRACT

A combined machine with selective actuation includes: support frame and ground support; an engine including a drive shaft; a driven shaft connected to the drive shaft by the engine; first and second operating machines connected to the driven shaft; and a set for selectively transmitting motion from the driven shaft to the operating machines. The transmission set includes: first and second belted transmissions operationally connecting the driven shaft to the first or second operating machine; and a movement unit to selectively move the driven shaft from idle to a first or second operating position. In operation, when the driven shaft is in the first operating position, the first belted transmission is under tension, actuating the first operating machine. When it is in the first operating position, the second belted transmission is under tension, actuating the second operating machine. In idle, both belted transmissions are slack, halting both operating machines.

12 Claims, 6 Drawing Sheets

(51) Int. Cl.
  *F16H 59/02* (2006.01)
  *F16H 63/30* (2006.01)
(52) U.S. Cl.
  CPC ............... *F16H 2059/0282* (2013.01); *F16H 2063/3093* (2013.01); *F16H 2342/044* (2013.01)
(58) Field of Classification Search
  CPC ..... F16H 2059/0282; F16H 2063/3093; F16H 2342/044
  USPC .................................................. 474/119, 121
  See application file for complete search history.

(56) References Cited

U.S. PATENT DOCUMENTS

| | | | | | |
|---|---|---|---|---|---|
| 694,211 | A * | 2/1902 | Souhami | ............... | F16H 7/08 474/119 |
| 932,000 | A * | 8/1909 | Cressman | ............. | F16H 7/0827 474/119 |
| 1,169,854 | A * | 2/1916 | Merritt | .................... | A01C 3/06 474/121 |
| 1,406,933 | A * | 2/1922 | Cohn | .................... | D05B 69/16 474/121 |
| 2,033,603 | A * | 3/1936 | Anderson | .............. | D01H 1/241 74/576 |
| 2,195,229 | A * | 3/1940 | Smart | ...................... | F16H 7/02 474/119 |
| 2,458,255 | A * | 1/1949 | Couse | ................... | F16H 7/0827 474/119 |
| 2,488,765 | A * | 11/1949 | Whitman | .............. | F16H 7/0827 474/119 |
| 2,504,624 | A * | 4/1950 | Barnes | .................... | F16H 35/10 474/119 |
| 2,509,054 | A * | 5/1950 | Davis | .................. | G11B 19/265 474/69 |
| 2,696,741 | A * | 12/1954 | Wilkin | ............... | F16H 7/0827 474/119 |
| 2,742,750 | A * | 4/1956 | Funk | ................. | A01D 34/6806 56/11.3 |
| 2,775,131 | A * | 12/1956 | Hubertus | .............. | G11B 19/27 474/84 |
| 2,948,374 | A * | 8/1960 | Husband | ................... | F16H 9/06 474/79 |
| 3,202,004 | A * | 8/1965 | Field | ........................ | F16H 9/04 476/16 |
| 3,367,459 | A * | 2/1968 | Rubin | ................ | A01D 34/6812 56/11.6 |
| 3,730,037 | A * | 5/1973 | Purrer | .................. | F16H 37/027 241/222 |
| 3,741,499 | A * | 6/1973 | Osborn | ................. | G03B 21/43 242/415.1 |
| 3,892,140 | A * | 7/1975 | Fox | .......................... | F16H 7/00 474/139 |
| 4,036,070 | A * | 7/1977 | Knight | ................. | F16H 7/0827 474/119 |
| 4,046,022 | A * | 9/1977 | Henderson | ................ | F16H 9/04 474/171 |
| 4,058,957 | A * | 11/1977 | Roseberry | .......... | A01D 34/6812 56/11.8 |
| 4,060,964 | A * | 12/1977 | Eaves | .................. | D02G 1/0266 57/284 |
| 4,068,452 | A * | 1/1978 | Schaefer | ................ | A01D 69/10 56/11.6 |
| 4,108,292 | A * | 8/1978 | Takano | ................ | F16H 7/0827 192/224.1 |
| 4,186,545 | A * | 2/1980 | Hutchison | .......... | A01D 34/6812 56/11.8 |
| 4,310,082 | A * | 1/1982 | Elmy | .................... | B60W 30/18 74/473.16 |
| 4,324,552 | A * | 4/1982 | Boushek, Jr. | .......... | A01D 69/00 474/135 |
| 4,409,779 | A * | 10/1983 | Bent | .................. | A01D 34/6812 56/11.6 |
| 4,498,889 | A * | 2/1985 | Stevens | ..................... | F16H 9/14 474/135 |
| 4,557,710 | A * | 12/1985 | Greider | .................. | A01D 34/69 474/119 |
| 4,832,661 | A * | 5/1989 | Wagner | ................... | F02B 63/04 474/69 |
| 4,941,864 | A * | 7/1990 | Bottum | .................. | F16H 7/1281 474/84 |
| 5,012,632 | A * | 5/1991 | Kuhn | ..................... | A01D 34/76 474/84 |
| 5,246,403 | A * | 9/1993 | Uphaus | ..................... | F16H 9/14 474/83 |
| 5,354,241 | A * | 10/1994 | Trefz | .................... | F16H 7/0827 474/135 |
| 5,410,923 | A * | 5/1995 | Yamashita | ............. | F16H 7/0827 74/473.26 |
| 5,679,083 | A * | 10/1997 | Eom | ..................... | F16H 7/0827 474/5 |
| 6,120,401 | A * | 9/2000 | Wilken | ................. | F16H 7/0827 474/134 |
| 6,186,915 | B1 * | 2/2001 | Dietl | ....................... | F16H 9/14 474/69 |
| 6,270,436 | B1 * | 8/2001 | Reik | ........................ | F16H 9/14 474/8 |
| 6,282,873 | B1 * | 9/2001 | Wilken | ................. | F16H 7/0827 474/134 |
| 6,478,701 | B1 * | 11/2002 | Yasuhara | .................. | F16H 7/12 474/135 |
| 8,033,374 | B2 * | 10/2011 | Gunton | ................. | E05F 15/603 160/331 |
| 8,057,335 | B1 * | 11/2011 | Langenfeld | .......... | F16H 7/0827 474/119 |
| 8,517,159 | B1 * | 8/2013 | Langenfeld | .......... | A01D 69/06 474/139 |
| 8,903,279 | B2 * | 12/2014 | Ishida | ....................... | F16H 7/12 399/167 |
| 9,188,930 | B2 * | 11/2015 | Ishida | ....................... | F16H 7/12 |
| 9,739,349 | B2 * | 8/2017 | Gergis | ..................... | F16H 7/08 |
| 9,939,052 | B2 * | 4/2018 | Bailliu | .................... | F16H 9/04 |
| 10,054,199 | B2 * | 8/2018 | Newman | .............. | F16H 7/1281 |
| 10,132,390 | B2 * | 11/2018 | Gunton | ................ | F16H 7/1263 |
| 10,295,026 | B2 * | 5/2019 | Williams | ............. | A01D 69/06 |
| 10,299,436 | B2 * | 5/2019 | Bailliu | .................... | A01D 41/06 |
| 10,690,224 | B2 * | 6/2020 | Hansen | .................. | F16H 7/12 |
| 11,293,529 | B2 * | 4/2022 | Forbes | .................. | F16H 7/0827 |
| 11,679,674 | B1 * | 6/2023 | Chapman | ................. | F16H 7/02 180/53.5 |
| 2007/0125055 | A1 * | 6/2007 | Ducoulombier | ..... | A01D 43/081 56/11.6 |
| 2009/0291787 | A1 * | 11/2009 | Kohigashi | ............. | F16H 7/0827 474/5 |
| 2013/0251404 | A1 * | 9/2013 | Ishida | .................. | G03G 15/754 399/167 |
| 2015/0050051 | A1 * | 2/2015 | Ishida | .................... | F16H 7/12 399/167 |
| 2016/0040759 | A1 * | 2/2016 | Gergis | ..................... | F16H 7/20 474/101 |
| 2017/0273243 | A1 * | 9/2017 | Bailliu | ................. | A01D 41/142 |
| 2017/0370448 | A1 * | 12/2017 | Hansen | .................... | F16H 7/12 |
| 2018/0106346 | A1 * | 4/2018 | Gonzalez-Mohino | .... | F16H 7/02 |
| 2018/0195585 | A1 * | 7/2018 | Williams | ................ | F16H 9/04 |
| 2019/0154120 | A1 * | 5/2019 | Williams | ............. | A01D 69/06 |
| 2021/0016408 | A1 * | 1/2021 | Mesinovic | ........... | F16H 7/1281 |
| 2021/0131533 | A1 * | 5/2021 | Mesinovic | .............. | B24B 55/04 |
| 2023/0074292 | A1 * | 3/2023 | Yamaguchi | ............... | F16H 7/02 |

FOREIGN PATENT DOCUMENTS

| | | |
|---|---|---|
| WO | 9608333 A1 | 3/1996 |
| WO | 2009112923 A1 | 9/2009 |
| WO | 2016210391 A1 | 12/2016 |

\* cited by examiner

COMBINED MACHINE WITH SELECTIVE ACTUATION

TECHNICAL FIELD OF APPLICATION

The invention pertains to the field of operating machines such as pumps, compressors, fans, and vacuum cleaners for use in the fields of hobbies, vehicle maintenance and washing, offices, and cleaning, as well as for professional purposes, etc. The invention pertains in particular to a combined machine with selective actuation with one or more operating machines, for example, a compressor and a high-pressure cleaner, actuated by a single motor independently.

STATE OF THE ART

The invention addresses the problem of allowing the selective actuation of operating machines using a single common motor for both. This is a requirement that arises particularly in the field of hobbies and also in semi-professional and professional settings; focus is placed on, for example, the convenience and multiple applications of a combined apparatus that is equipped with a motor and, for example, a compressor and a high-pressure cleaner that can be actuated separately.

A patent filed by the same applicant describes a transmission set for combined machines of the type mentioned above, comprising a drive shaft, a number of driven shafts and at least one free-wheel ball bearing that is arranged to entrain a corresponding drive shaft. In the present description, the term "free-wheel ball bearing" is intended to mean a ball bearing that transmits the motion of said device only in the direction called "meshing" or "locking," while it is idle in the opposite direction.

In addition to the above-mentioned transmission set, the machine essentially comprises a motor and two (or more) operating machines, for example, a pump and a compressor, or a pump, a compressor, a vacuum cleaner or vacuum pump. Reversing the direction of rotation of the drive shaft stops some of the operating machines while at the same time actuating others, depending on the direction of locking of the free-wheel ball bearings of the transmission set.

This approach essentially requires a motor with a reversible direction of rotation. This motor can be electrical, with an appropriate switch to reverse the direction of rotation, or an internal-combustion engine that is able to rotate in both directions thanks to the presence of an appropriate inverter.

Using a motor with a reversible direction of rotation may, however, be a limitation.

Not all electric motors are equipped with a rotation switch, and it is known that some internal-combustion engines, and in particular four-stroke engines, are able to rotate in only one direction due to the asymmetrical distribution scheme.

Four-stroke engines may be preferable in semi-professional or professional settings when the corresponding power outputs and/or independence from the electrical grid are required.

In addition, the installation of the free-wheel ball bearings requires some modification of the operating machines. These modifications are not generally difficult, but they still require that work be done on standard machines already in use, involving removing and/or modifying some of their parts.

PRESENTATION OF THE INVENTION

The purpose of the invention is to overcome these limitations. In greater detail, the invention is designed to create a combined machine with selective actuation with at least two separately actuatable operating machines that makes it possible to use any engine/motor, electrical or thermal, as well as having a non-reversible direction of rotation and without requiring working on or modifying the operating machines themselves.

These goals are achieved by a combined machine with selective actuation, which comprises:
- a support frame and ground support;
- a kinematic engine that comprises a drive shaft;
- a driven shaft that is operationally and permanently connected to said drive shaft by means of the kinematic engine;
- a first and a second operating machine that can be operationally connected to the above-mentioned driven shaft;
- a set for transmitting the motion of the above-mentioned driven shaft to the operating machines selectively, characterized by the fact that said transmission set comprises:
- a first and a second belted means of transmission that are able to operationally connect the above-mentioned driven shaft to, respectively, the first or the second operating machine;
- means of handling for said driven shaft that are able to ensure the selective switching of the driven shaft from an idle position to the above-mentioned first or a second operating position, such that:
- when the above-mentioned driven shaft is in the first operating position, the above-mentioned belted means of transmission are tensioned and thus the first operating machine is actuated;
- when the above-mentioned driven shaft is in the second operating position, the above-mentioned second belted means of transmission are tensioned and thus the second operating machine is actuated;
- when the above-mentioned driven shaft is in the idle position, the above-mentioned first and second belted means of transmission are slack and the above-mentioned first and second operating machines are halted.

Advantageously, the above-mentioned idle position of the above-mentioned driven shaft is located between the above-mentioned first operating position and the above-mentioned second operating position.

According to a first feature of the invention, the above-mentioned movement means for the above-mentioned driven shaft comprise an oscillating device that is, at least indirectly, hinged to the above-mentioned frame and the above-mentioned driven shaft is associated therewith, in such a way that the oscillation of the above-mentioned device moves the above-mentioned driven shaft from the above-mentioned idle position to the above-mentioned first or second operating position.

Finally, the above-mentioned movement means for the above-mentioned driven shaft comprise a control lever that is operationally connected between the above-mentioned frame and the above-mentioned oscillating device and is able to act on the above-mentioned oscillating device in order to cause the above-mentioned driven shaft to selectively move into one of the above-mentioned positions.

According to another feature of the invention, the above-mentioned driven shaft comprises a first and a second driven pulley which are coaxial with one another and are able to work with, respectively, the first and the second belted means of transmission.

According to a possible embodiment, the kinematic engine comprises a first drive pulley that is mounted on the above-mentioned drive shaft, a second drive pulley that is mounted on the above-mentioned driven shaft, and third belted means of transmission that are able to operationally connect the above-mentioned first drive pulley to the above-mentioned second drive pulley and thus is able to connect the above-mentioned first drive shaft to the second drive pulley and thus to connect the above-mentioned drive shaft to the above-mentioned driven shaft.

In an alternate variant, the above-mentioned kinematic engine comprises a first drive pulley that is mounted on the above-mentioned drive shaft, a second drive pulley that is mounted on the above-mentioned driven shaft, an idler shaft, an idler pulley mounted on the above-mentioned idler shaft, third belted means of transmission that are able to operationally connect the above-mentioned first drive pulley to the above-mentioned delay pulley, and are thus able to connect the above-mentioned drive shaft to the above-mentioned idle delay shaft, and fourth belted means of transmission that are able to operationally connect the above-mentioned idle delay pulley to the above-mentioned second drive pulley and thus are able to connect the above-mentioned idle delay shaft to the above-mentioned driven shaft.

In a particularly preferred embodiment of the invention, the above-mentioned combined machine comprises at least one belt tensioner with runner that is able to act on the above-mentioned first belted means of transmission so that they are under tension even when the above-mentioned driven shaft is in the second operating position or, alternatively, is able to act on the above-mentioned second belted means of transmission so that they are under tension even when the driven shaft is in the first operating position, thus making it possible for the first and second operating machines to be actuated simultaneously.

Alternatively, the above-mentioned combined machine comprises transmission, at least indirectly via the above-mentioned driven shaft, that are able to move the above-mentioned driven shaft selectively downward in a vertical direction from the above-mentioned idle position to a third operating position in which the above-mentioned second and third belted means of transmission are under tension and the above-mentioned first and second operating machines are actuated simultaneously.

Advantageously, the above-mentioned kinematic engine comprises a belt tensioner with runner that is able to act on the above-mentioned third belted means of transmission in order to keep the tension constant depending on the positions of the above-mentioned drive shaft and the above-mentioned driven shaft with respect to one another, by deforming the path of the above-mentioned third belted means of transmission, creating a bend that is able to compensate for an increase in the distance between the above-mentioned drive shaft and the above-mentioned driven shaft.

According to other aspects of the invention, the above-mentioned combined machine combines clutch means that are associated either with the above-mentioned drive shaft or the above-mentioned driven shaft and are able to decouple the transmission of motion between the above-mentioned drive shaft and the above-mentioned first and second operating machines.

Preferably, these clutch means comprise a variable-adjustment clutch.

An important advantage of the invention lies the fact that it is possible to use almost any kind of motor/engine that has a single direction of rotation.

The motor/engine according to the invention can be of any known type; in particular, the motor/engine can be both electrical and internal-combustion, either two-stroke or four-stroke.

For the drive shaft, it is also possible to use the drive shaft of an electrical generator set that is made up of an internal-combustion engine and electrical generator, thus providing both a source of electric power for tools such as a drill, grinding device, welder, etc. or a motor-pump set, etc. When electrical power is not required, the generator runs without taking up energy, which can then be made available for the operating machines. In this variant, a single motor/engine can run three or more operating machines.

An always advantageous feature is the fact that there are no restrictions regarding the type of operating machine accessories, such as pumps, compressors, vacuum cleaners, or fans, drills, grinders, etc.

Another advantage of the invention is its structural simplicity and the compactness of the selective motion transmission set, which does not take up an excessive amount of room inside the combined machine, which uses an appropriately positioned driven shaft and a three-position control lever.

BRIEF DESCRIPTION OF THE FIGURES

The advantages of the invention will be better appreciated from the material presented below, which describes a preferred embodiment, which is only for purposes of illustration and is not limiting, and with the aid of the figures, where.

DETAILED DESCRIPTION OF THE PREFERRED ACTUATION MODES OF THE INVENTION

Figure 1:
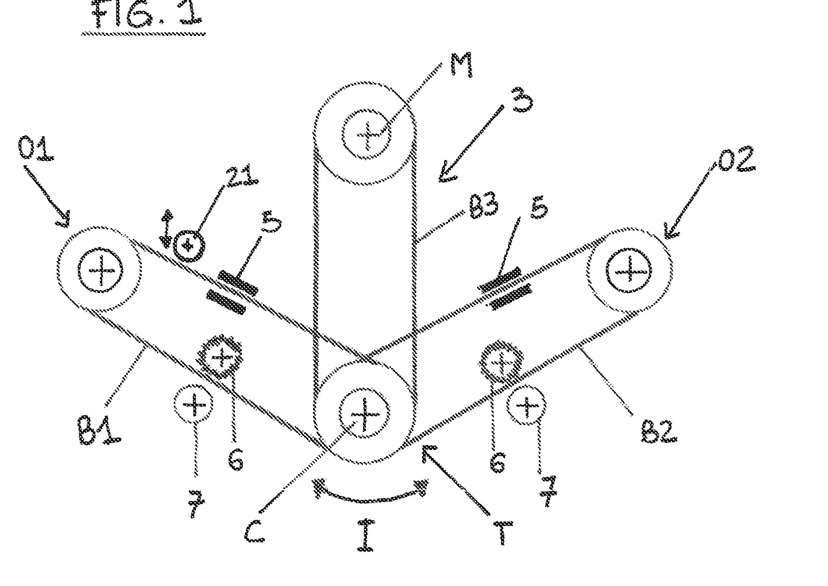
FIG. 1 shows in schematic form the main components of a combined machine with selective activation according to a first variant of the invention.
Figure 2:
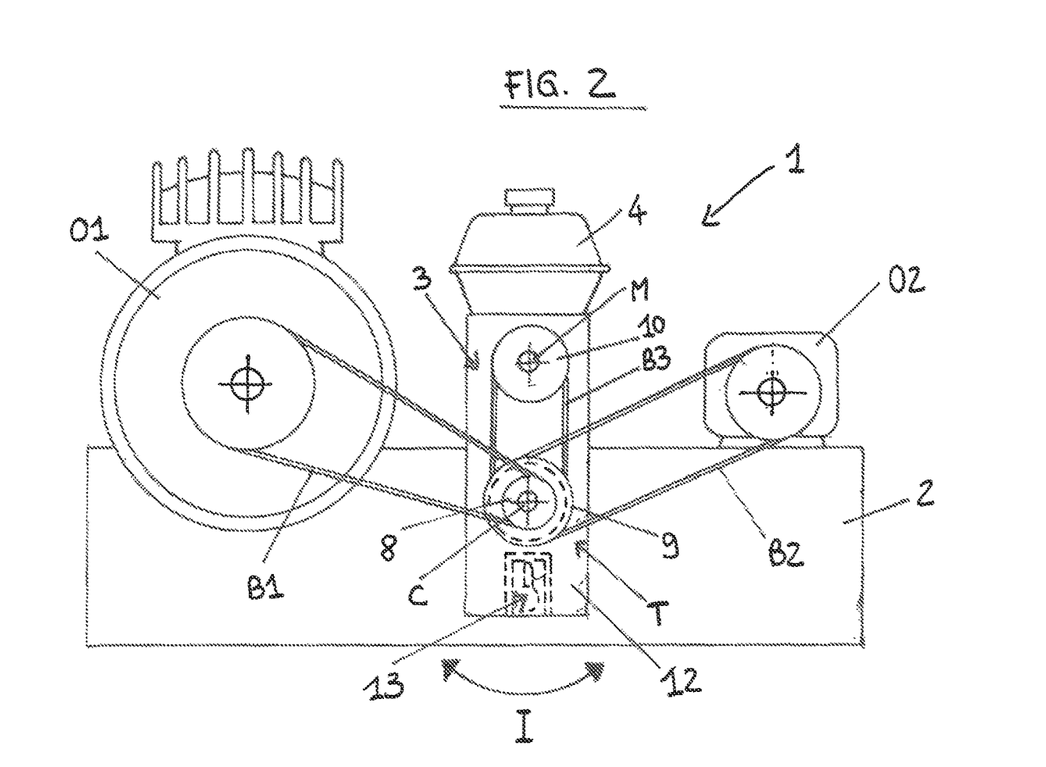
FIGS. 2, 3, and 4 show a front view of the combined machine with selective activation of FIG. 1 in three different operating positions.
Figure 5:
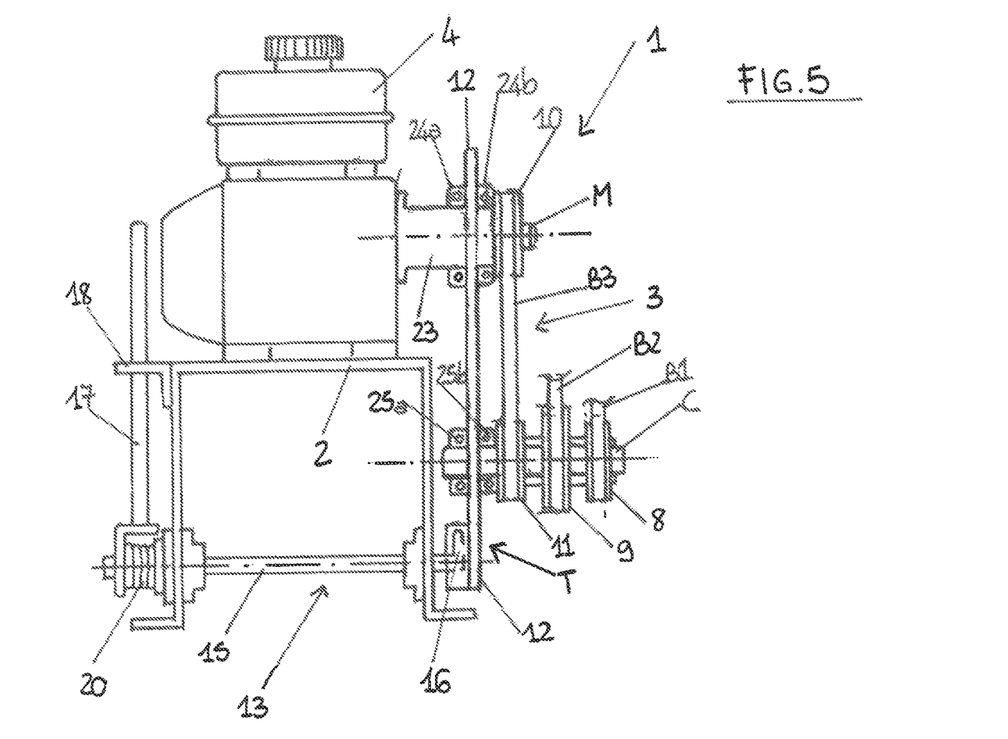
FIG. 5 shows in a lateral partial cut-away view of the combined machine of FIG. 2.

With particular reference to the diagram in FIG. 1 and FIGS. 2 and 5, a combined machine 1 with selective activation is illustrated according to a first variant of the invention, that comprises essentially:

a support frame 2 and ground support;
a kinematic engine 3 that comprises a motor 4 and a drive shaft M that is connected thereto;
a driven shaft C that is operationally and permanently connected to the drive shaft M;

a first operating machine O1 and a second operating machine O2, both of which can be operationally connected to the above-mentioned driven shaft C;

a set T for transmitting the motion of the above-mentioned driven shaft C to the operating machines O1 and O2, which operate selectively.

In the variant that is illustrated, this engine is a two-stroke internal-combustion engine, the above-mentioned first operating machine O1 is a compressor and the above-mentioned second operating machine O2 is a high-pressure cleaner with a high-pressure pump. It is clear that the possible applications are not limited to the engine and to the above-mentioned operating machines, but rather potentially extend to any motor/engine and any machine that can be effectively actuated with the pre-selected motor/engine.

This set T for transmitting motion comprises first B1 belted means of transmission and second B2 belted means of transmission, and the above-mentioned first O1 and second O2 operating machines are operationally connected to the above-mentioned driven shaft C by means of, respectively, the first B1 and second B2 belted means of transmission.

The above-mentioned driven shaft C is connected to the above-mentioned drive shaft M by means of a third belted means of transmission B3.

The above-mentioned belted means of transmission, in particular the first above-mentioned belted means of transmission B1 and the second above-mentioned belted means of transmission B2, comprise belts that have a certain level of rigidity and are able to maintain their shape even when they are not under tension.

As FIG. 1 shows, along the first belted means of transmission B1 and the second belted means of transmission B2 there are belt guides 5 that are able to keep the belts in position and ensure the proper transmission of motion from the driven shaft C to the operating machines O1, O2.

Along each of the first belted means of transmission B1 and the second belted means of transmission B2 there is at least one free-wheel ball bearing 6 paired with an idler pulley 7. As we know, free-wheel ball bearings are special ball bearings that transmit movement in only one direction of rotation (the "engagement" or "locking" direction), while they are idle in the opposite direction of rotation.

The above-mentioned free-wheel ball bearing 6 is mounted with a pre-set direction of engagement. In particular, this free-wheel ball bearing 6 is arranged in such a way as to facilitate the passage of the belt when the latter is rotated by the above-mentioned driven shaft C; alternatively, when the driven shaft C is in the state where it does not transmit motion to the belt, the above-mentioned free-wheel ball bearing 6 "engages" and, due to friction with the idler pulley 7, completely prevents the belt from moving in the other direction due to residual inertia.

As an alternative to free-wheel ball bearings, it is also possible to use pulleys with magnetic brakes, or sliding pulleys, or any other equivalent mechanical device.

In detail, as clearly shown in the lateral view of FIG. 5:
the above-mentioned driven shaft C comprises a first driven pulley 8 and a second driven pulley 9, which are coaxial with one another and are able to work together with, respectively, the first belted means of transmission B1 and the second belted means of transmission B2;

the above-mentioned kinematic engine comprises the above-mentioned first drive pulley 10 that is connected to the drive shaft M, the second drive pulley 11 that is connected to the above-mentioned driven shaft C and third belted means of transmission B3, which are able to connect the above-mentioned first drive pulley 10 and the above-mentioned second drive pulley 11 operationally and are thus able to connect drive shaft M to driven shaft C.

The above-mentioned first driven pulley 8 and second driven pulley 9 are also coaxial with the above-mentioned second drive pulley 11, where all of these devices are mounted on the driven shaft C.

The ratios between the drive shaft M and the driven shaft C are loose: the operational connection of the two shafts can constitute a reducer, a multiplier, or they can simply be together in a ratio of 1:1.

The ratios between the driven pulleys 8, 9 may be equal to each other, or they may be different depending on the type of operating machine or the external power take-off that ensures engagement with the driven shaft C; in a possible variant, these driven pulleys may be variable pulleys; variation of their diameters would cause variation in the RPM in the transmission of motion to the respective operating machines.

The above-mentioned selective motion transmission set T comprises essentially means for moving the above-mentioned driven shaft C, where said means are able to selectively move the driven shaft C from an idle position I (FIG. 2) where both of the operating machines O1, O2 are halted, to a first operating position R (FIG. 3) where the above-mentioned first operating machine O1 is active, or to a second operating position L (FIG. 4) where the above-mentioned second operating machine O2 is active.

Figure 3:
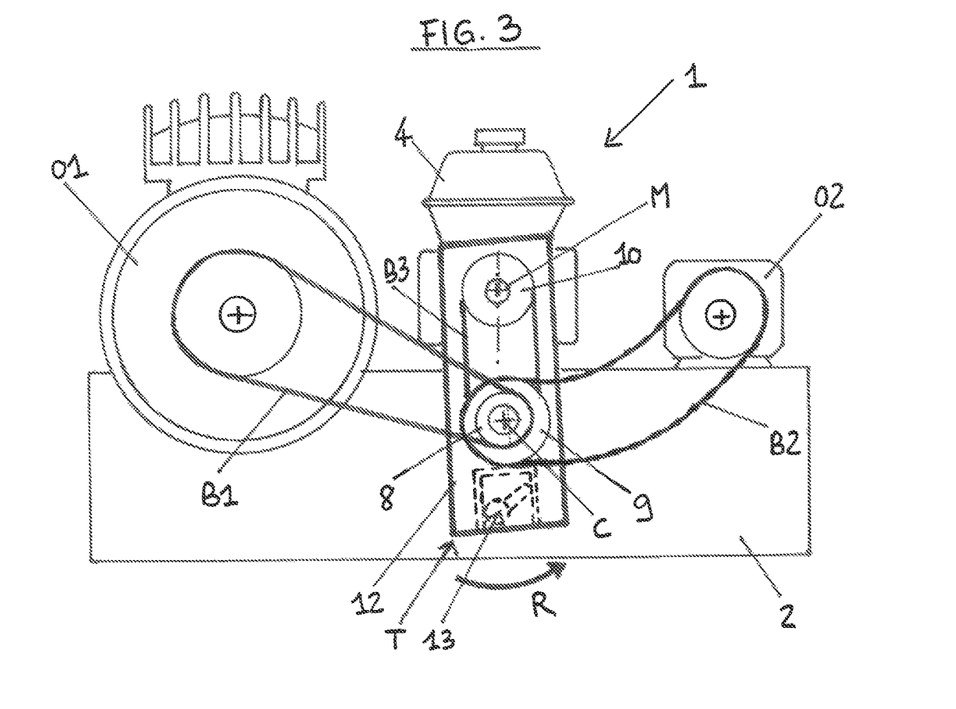
Figure 4:
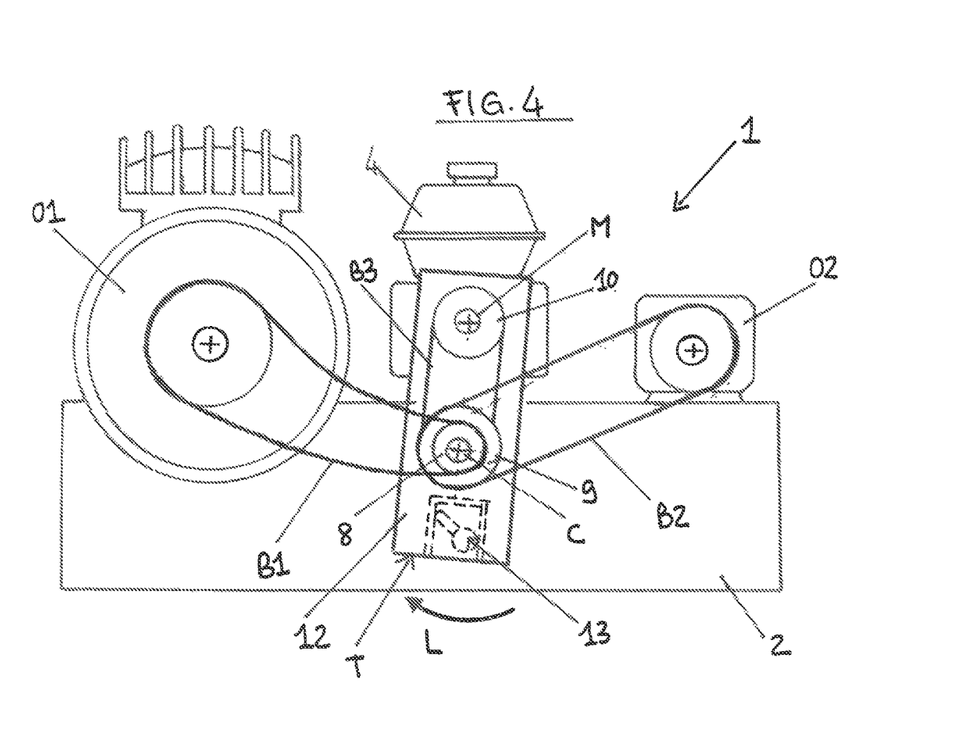

In other words:
when the above-mentioned driven shaft C is in the idle position I, the first belted means of transmission B1 and second belted means of transmission B2 are both slack, and the first operating machine O1 and second operating machine O2 are halted and at rest;

when the above-mentioned driven shaft C is in the above-mentioned first operating position R, the first belted means of transmission B1 are under tension and the first operating machine O1 is actuated, while the second belted means of transmission B2 are slack.

when the above-mentioned driven shaft C is in the above-mentioned second operating position L, the second belted means of transmission B2 are under tension and the second operating machine O2 is actuated, while the first belted means of transmission B1 are slack.

This idle position I of the driven shaft C becomes advantageous at the moment when the engine of the combined machine 1 is lifted in order to avoid resistance and also when both the operating machines are at rest in order to avoid switching off the engine 4.

In the variant shown here, the above-mentioned idle operating position I of the driven shaft C is located between the first operating position R and the second operating position L.

The movement means for the driven shaft C comprise:
an oscillating device 12 that is hinged at least indirectly to the above-mentioned frame 2, especially in the variant shown in FIGS. 1-6, where said oscillating device is able to rotate around the above-mentioned drive shaft M thanks to a sleeve 23 which is coaxial with the above-mentioned drive shaft M, and is also hinged to an appropriate pair of free-wheel ball bearings 24a, 24b;

a control lever 13 that is operationally connected between the above-mentioned frame 2 and the above-mentioned oscillating device 12 and is able to act on the latter in order to cause it to rotate and to cause the subsequent movement of the driven shaft C.

The above-mentioned oscillating device 12 is shown in the figures as a plate, but alternatively it can also be designed as a rod or other rigid part.

Figure 6:
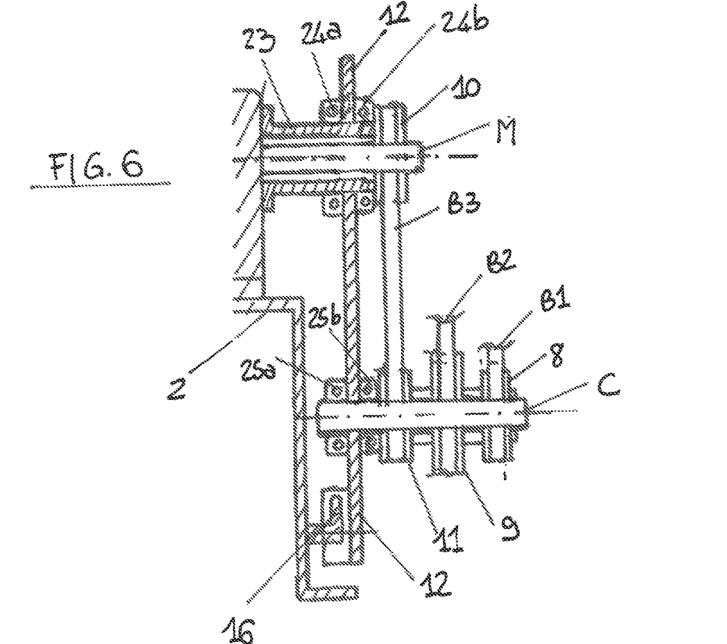
FIG. 6 shows, in a section along a vertical plane, a detail of FIG. 5.

With particular reference to the detail section of FIG. 6, the means are shown by which the oscillating device 12 is attached to the frame 2 of the combined machine 1 and interacts with the drive shaft M. This oscillating device 12 should in fact be able to rotate around the above-mentioned drive shaft M and at the same time should leave the drive shaft M free to rotate on itself.

Around the above-mentioned drive shaft M there is a sleeve 23 which is designed as a hollow shaft through which the drive shaft M runs coaxially. This sleeve 23 is permanently associated with the above-mentioned frame 2. There are thus two ball bearings 24a, 24b that are located on either side of the oscillating device 12 and to which the above-mentioned sleeve 23 and the above-mentioned plate of the oscillating device 12 are connected, in such a way as to make the movements of the oscillating device 12 and the drive shaft M independent, although rotating around a single axis.

Again with reference to the section view of FIG. 6, a second pair of free-wheel ball bearings 25a, 25b is shown that is able to allow the oscillating device 12 to support the driven shaft C in order to move it into the different operating positions I, R, L but at the same time leave it free to receive the rotational motion transmitted from the drive shaft M. In this case as well, the two ball bearings 25a, 25b are located on either side of the oscillating device 12 and are attached between the driven shaft C and the plate of the oscillating device 12 so as to make the movements of the driven shaft and the oscillating device independent.

Each pair of ball bearings 24a, 24b and 25a, 25b is arranged straddling the plate of the oscillating device 12 so as to ensure that it is aligned and kept in position regardless of the play forces.

The oscillation of the above-mentioned device 12 moves the driven shaft C from an idle position I into the first operating position R or the second operating position L and as a result puts the first belted means of transmission B1 or second belted means of transmission B2 under tension.

Figure 8:
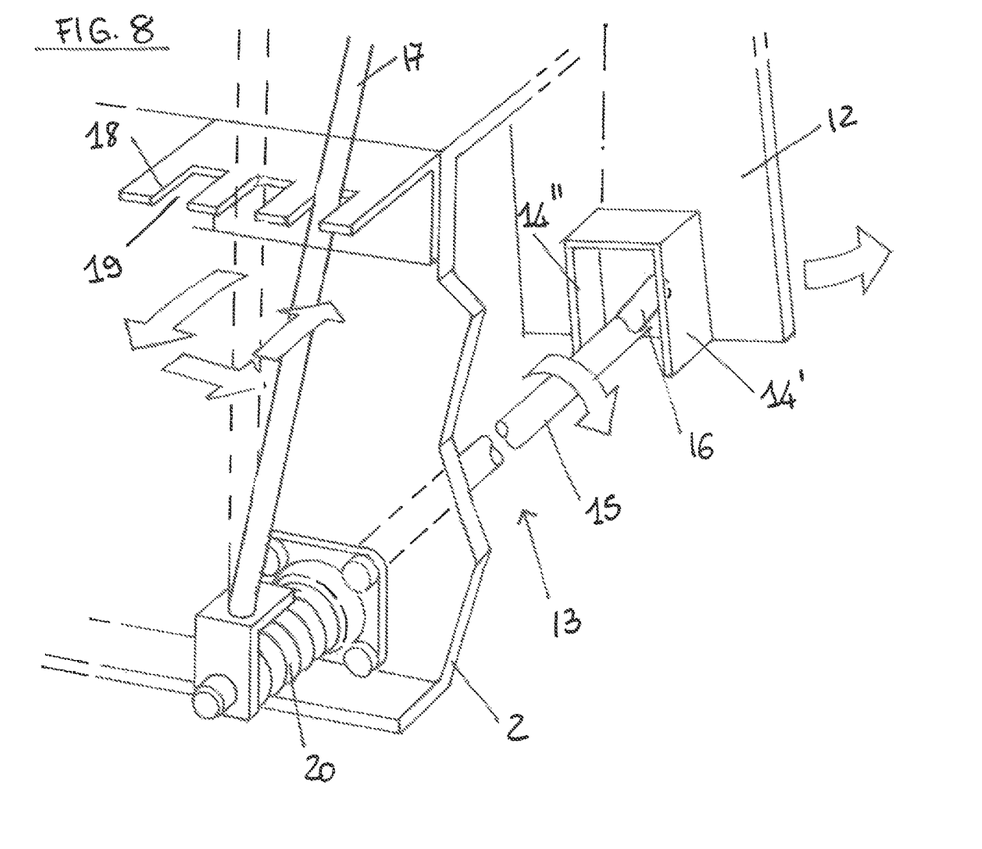

With particular reference to FIGS. 3 and 4 and to the detailed views of FIGS. 6 and 8, this oscillating device 12 comprises a first surface plate 14' and a second surface plate 14" for a tooth 16 that is moved by the control lever 13; the act of this tooth 16 acting on either of the surface plates 14', 14" determines the direction of rotation of the oscillating device 12 and thus causes the driven shaft C to move toward either of the operating positions R, L.

Figure 7:
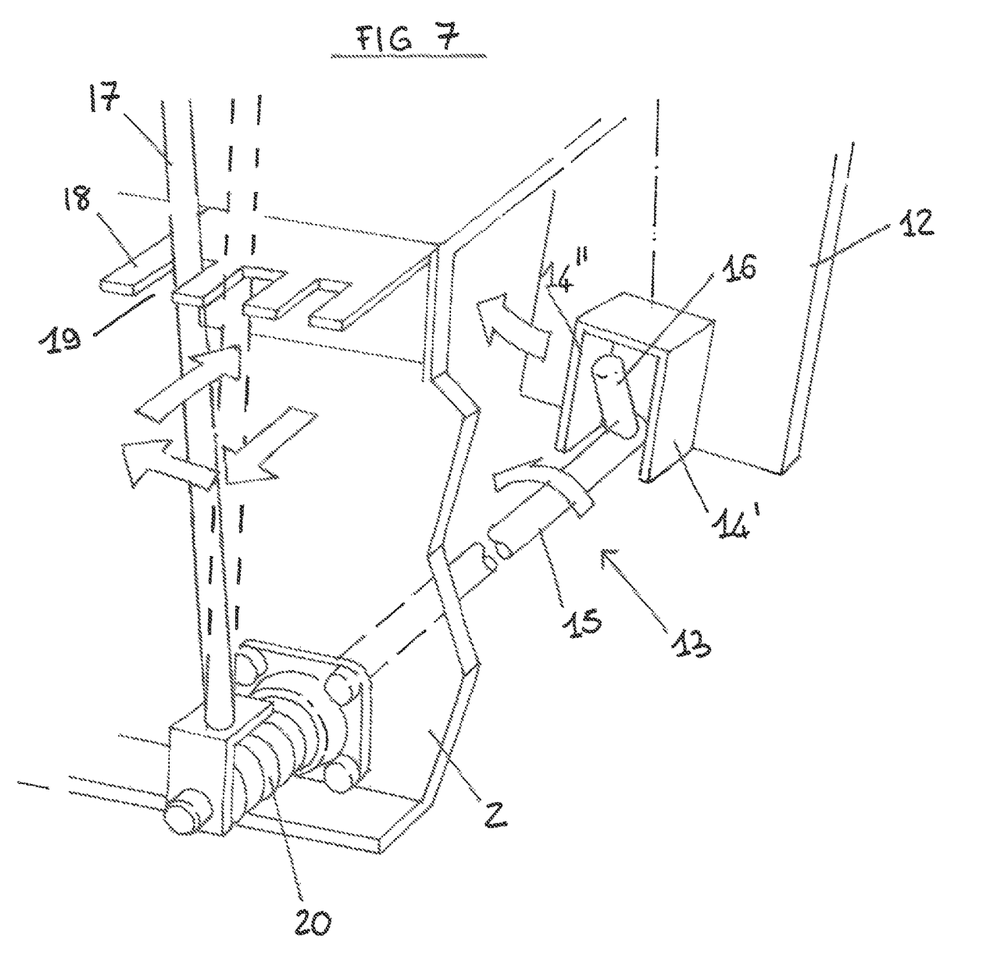
FIGS. 7 and 8 show, in an axonometric view, details of the combined machine according to one possible variant of the invention pertaining respectively to the operating positions of FIGS. 3 and 4.

With particular reference to FIGS. 5, 7, and 8, the control lever 13 comprises:
an actual control rod 15 that can rotate around its own longitudinal axis and is located at the end of the tooth 16, which is able to work directly with, and alternatively, with the above-mentioned first 14' (FIG. 7) or second 14" surface plates (FIG. 8);
a handle 17 that is accessible to the user from the outside of the combined machine 1 and is permanently associated with the above-mentioned control rod 15;
selective locking means for the handle 17 of this control rod 13 in a selected position depending on whether the first operating machine O1 or second operating machine O2 is to be activated.

The above-mentioned handle 17 essentially corresponds to the oscillating device 12, behind it and opposite with respect to the frame 2.

The locking means comprise a comb 18 between whose teeth housings 19 are placed that can be selectively engaged by the above-mentioned handle 17.

Between the above-mentioned control rod 15 and the above-mentioned sleeve 17, spring-loaded elastic means 20 are interposed that are able to facilitate the moving of this handle 17 so that it can occupy or free up one of the housings 19.

Finally, moving the above-mentioned control rod 15 from one housing 19 to another torsion-loads the spring-loaded elastic means 20, helping to keep the respective belted means of transmission under tension even when they would be subject to slackening due to wear and tear.

In a possible variant (not shown) the above-mentioned control lever 13 is external to the oscillating device 12; the above-mentioned control rod 15 is not able to rotate around its own longitudinal axis but rather slides along it; the above-mentioned tooth has a length such that it is arranged to be in contact with the above-mentioned oscillating device, hooking to it; moving the above-mentioned control rod closer to or further away from the above-mentioned oscillating device causes the above-mentioned tooth to push or pull the above-mentioned oscillating device, in turn moving the above-mentioned driven shaft into a first or a second operating position.

Even though the purpose of a combined machine 1 with selective actuation according to the invention would make an operating machine O1, O2 in turn, there may exist particular occasions when it is necessary to activate both the operating machines O1, O2 simultaneously.

For this purpose, the combined machine 1 comprises at least one [one or more words omitted, "un's is not a word in Italian] with runner (shown in the diagram of FIG. 1) that can be positioned close to either the first belted means of transmission B1 or the second belted means of transmission B2. In the variant shown here, the belt tensioner 21 with runner is arranged to work with the above-mentioned first belted means of transmission B1 to ensure that they are under tension even when the above-mentioned driven shaft C was in the second operating position L.

Alternatively, if the belt tensioner 21 with runner were arranged on the above-mentioned second belted means of transmission B2, its action would cause the above-mentioned second belted means of transmission B2 to be under tension even when the above-mentioned driven shaft C was in the first operating position R.

Figure 10:
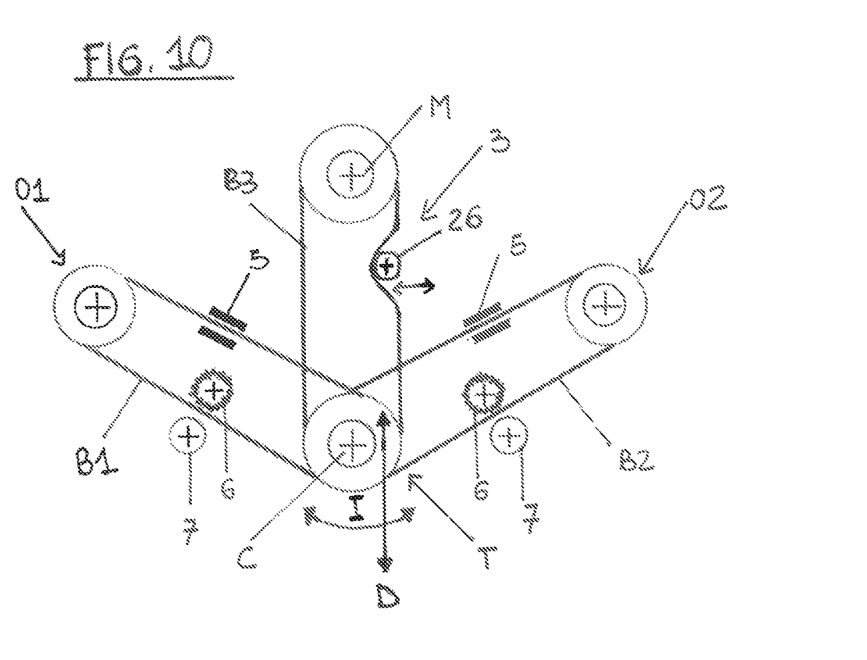
FIG. 10 shows in schematic form the main parts of a combined machine with selective activation according to another possible variant of the invention.

With particular reference to the diagram of FIG. 10, another variant is shown of the combined machine 1 according to the invention, and this variant is especially advantageous in the case where the focus is on actuating both the operating machines O1, O2 simultaneously.

This combined machine 1 comprises means of transmission, at least indirectly, for the above-mentioned driven shaft C. These means of transmission are able to move the above-mentioned driven shaft C selectively downward in a vertical direction by acting directly on said shaft or alternatively on its oscillating device.

These means of transmission cause the above-mentioned driven shaft C to move from the idle position I, in which the above-mentioned first belted means of transmission B1 and the second belted means of transmission B2 are slack and neither of the operating machines O1, O2 is actuated, to a third operating position D in which the above-mentioned first belted means of transmission B1 and second above-mentioned belted means of transmission B2 are under tension and the first operating machine O1 and second operating machine O2 are thus actuated simultaneously.

According to a first embodiment of these means of transmission, the entire oscillating device 12, with which the driven shaft C is associated, is to be moved downward; for this purpose, this oscillating device 12 advantageously comprises an eyelet into which the above-mentioned drive shaft M is inserted.

According to a second embodiment, this oscillating device is of the telescoping type and comprises two plates that are able to slide one over the other: a first plate is able to rotate around the above-mentioned drive shaft M, a second plate is the one with which the driven shaft C is associated and which, sliding with respect to the first plate, is able to move downward, carrying the driven shaft C into the third operating position D.

According to a third embodiment, this oscillating device 12 comprises an eyelet into which the above-mentioned driven shaft C is able to slide, thus allowing the latter to occupy the third operating position D.

Since the above-mentioned second and third embodiments involve separation between the above-mentioned drive shaft M and the above-mentioned driven shaft C, the above-mentioned kinematic engine 3 comprises, in both cases, a belt tensioner 26 with runner that is able to act on bot the above-mentioned third belted means of transmission B3 in order to keep their tension constant depending on the positions of the above-mentioned drive shaft M and driven shaft C with respect to one another.

The above-mentioned belt tensioner 26 is able to act on the third belted means of transmission B3 by deforming its path, thus creating an eyelet so that both will be under tension even when the above-mentioned driven shaft C is in the idle position I. The above-mentioned belt tensioner 26 is thus able to move, thereby reducing the above-mentioned eyelet when the movement of the above-mentioned driven shaft C into the above-mentioned third operating position D causes, as described in the second and third embodiments, an increase in the distance between the above-mentioned drive shaft M and the above-mentioned driven shaft C.

Again with a view to optimizing the operation of the combined machine 1 according to the invention, it may be necessary to halt both the operating machines O1, O2 without the operating machines having to act on the oscillating device 12 in order to bring the driven shaft C into the idle position I.

To do this, the above-mentioned combined machine 1 comprises clutch means (not shown) that can be associated either with the drive shaft M or the driven shaft C and that are able to decouple the transmission of motion between the above-mentioned drive shaft M and the above-mentioned first operating machine O1 and second operating machine O2. Preferably, these clutch means comprise a variable-calibration clutch that is thus able to come into operation when the respective shaft on which it is mounted reaches a pre-determined RPM.

Figure 9:
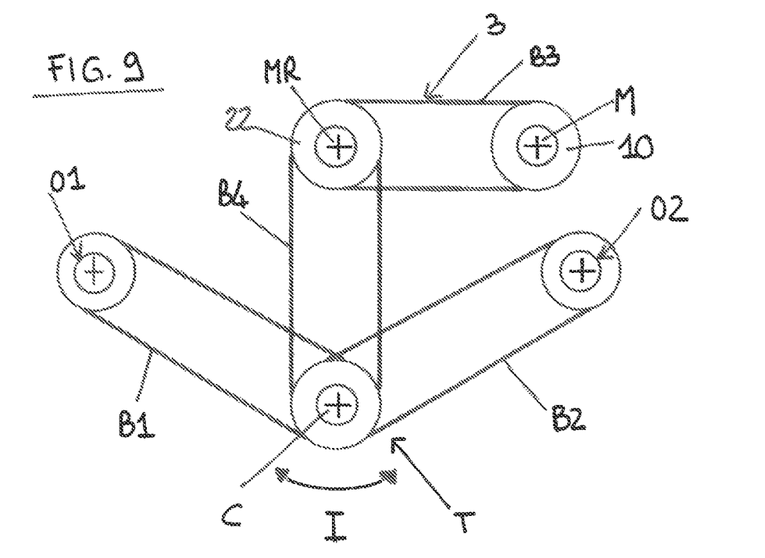
FIG. 9 shows in schematic form the main parts of a combined machine with selective activation according to another possible variant of the invention.

The diagram of FIG. 9 shows a possible variant of the invention with a particular distribution of components that is able, for example, to overcome obstruction constraints or space requirements.

In fact, the axes of the above-mentioned drive shaft M and driven shaft C do not fall on the same vertical plane as occurs in the variant shown in the diagram of FIG. 1.

What changes is the configuration of the kinematic engine 3, while the operation of the motion transmission set T remains the same.

In this variant, the kinematic engine 3 of FIG. 9 comprises:
- a first drive pulley 10 that is mounted on the drive shaft M;
- a second drive pulley 11 that is mounted on the above-mentioned driven shaft C;
- an idle delay shaft MR, a delay pulley 22 that is mounted on the above-mentioned idle delay shaft MR;
- third belted means of transmission B3 that are able to operationally connect the above-mentioned first drive pulley 10 to the above-mentioned delay pulley 22 and thus connect the above-mentioned drive shaft M to the above-mentioned idle delay shaft MR;
- fourth belted means of transmission B4 that are able to operationally connect the above-mentioned delay pulley 22 to the above-mentioned second drive pulley 11 and thus to connect the above-mentioned idle delay shaft MR and the above-mentioned driven shaft C.

In the variant of FIG. 9, the above-mentioned oscillating device 12 is able to rotate around the above-mentioned idle delay shaft MR, thanks in all cases to the interposition of a sleeve (or hollow shaft) and an appropriate pair of ball bearings.

The invention claimed is:

1. Combined machine with selective actuation, comprising:
   a support frame and ground support;
   a kinematic engine comprising a drive shaft;
   a driven shaft that is operationally and permanently connected to the drive shaft by means of the kinematic engine;
   a first operating machine and a second operating machine that can be operationally connected to the driven shaft;
   a set for selectively transmitting motion from the driven shaft to the operating machines
   wherein the transmission set comprises:
   first belted means of transmission and second belted means of transmission for operationally connecting the driven shaft to, respectively, the first operating machine or the second operating machine;
   movement means for the driven shaft that are able to selectively move the driven shaft from an idle position to a first operating position or second operating position,
   such that:
   when the driven shaft is in the first operating position, the first belted means of transmission are under tension thus the first operating machine is actuated;
   when the driven shaft is in the first operating position, the second belted means of transmission are under tension and thus the second operating machine is actuated;
   when the driven shaft is in the idle position, the first belted means of transmission and second belted means of transmission are slack and the first operating machine and second operating machine are halted.

2. The combined machine with selective control in accordance with claim 1, wherein the idle position of the driven shaft is located between the first operating position and the second operating position.

3. The combined machine with selective control in accordance with claim 1, wherein the movement means for the driven shaft comprise an oscillating device that is hinged at least indirectly to the frame and the driven shaft is associated therewith, in such a way that the oscillation of the device moves the driven shaft from the idle position to the first operating position or to the second operating position.

4. The combined machine with selective control in accordance with claim 3, wherein the movement means for the driven shaft comprise a control lever which is operationally connected between the frame and the oscillating device and is able to act on this oscillating device in order to cause the driven shaft to selectively move the driven shaft into one of the positions.

5. The combined machine with selective control in accordance with claim 1, wherein the driven shaft comprises a first driven pulley and a second driven pulley that are coaxial with respect to one another and are able to work with, respectively, the first belted means of transmission and second belted means of transmission.

6. The combined machine with selective control in accordance with claim 1, wherein the kinematic engine comprises a first drive pulley that is mounted on the drive shaft, a second drive pulley that is mounted on the driven shaft, and third belted means of transmission that are able to operationally connect the first drive pulley to the second drive pulley and thus to connect the drive shaft to the driven shaft.

7. The combined machine with selective control in accordance with claim 1, wherein the kinematic engine comprises a first drive pulley which is mounted on the drive shaft, a second drive pulley which is mounted on the driven shafts, and idle delay shaft, a delay pulley which is mounted on the idle delay shaft, third belted means of transmission that is able to operationally connect the first drive pulley to the delay pulley and is thus able to connect the drive shaft to the idle delay pulley, and fourth belted means of transmission, which are able to operationally connect the delay pulley to the second drive pulley and is thus able to connect the idle delay pulley and the driven shaft.

8. The combined machine with selective control in accordance with claim 1, further comprising at least one belt tensioner with runner, which is able to act on the first belted means of transmission to ensure that the first belted means of transmission are under tension even when the driven shaft is in the second operating position or, alternatively, is able to act on the second belted means of transmission so that the second belted means of transmission they are under tension even when the driven shaft is in the first operating position, thus allowing the first operating machine and the second operating machine to be actuated simultaneously.

9. The combined machine with selective control in accordance with claim 6, further comprising at least indirect means of transmission for the driven shaft that are able to selectively move the driven shaft downward, in a vertical direction, from the idle position to a third operating position in which the first belted means of transmission and second belted means of transmission are under tension and the first operating machine and second operating machine are actuated simultaneously.

10. The combined machine with selective control in accordance with claim 9, wherein the kinematic engine comprises a belt tensioner with runner which is able to act on the third belted means of transmission in order to keep the third belted means of transmission tension constant depending on the positions of the drive shaft and driven shaft with respect to one another by deforming the path of the third belted means of transmission, creating an eyelet that is able to provide compensation when the distance between the drive shaft and driven shaft increases.

11. The combined machine with selective control in accordance with claim 1, further comprising clutch means that are associated either with the drive shaft or the driven shaft and are able to decouple the transmission of motion between the drive shaft and the first operating machine and second operating machine.

12. The combined machine with selective control in accordance with claim 11, wherein the clutch means comprise a variable-calibration clutch.

* * * * *